(No Model.)

H. HOWELL.
THREE-WAY COCK.

No. 453,445. Patented June 2, 1891.

WITNESSES:
F. L. Ourand
W. L. Coombs

INVENTOR:
Harry Howell,
by Davis Bagger & Co.,
Attorneys

UNITED STATES PATENT OFFICE.

HARRY HOWELL, OF WILMINGTON, DELAWARE.

THREE-WAY COCK.

SPECIFICATION forming part of Letters Patent No. 453,445, dated June 2, 1891.

Application filed September 8, 1890. Serial No. 364,356. (No model.)

*To all whom it may concern:*

Be it known that I, HARRY HOWELL, a citizen of the United States, and a resident of Wilmington, in the county of New Castle and State of Delaware, have invented certain new and useful Improvements in Three-Way Cocks; and I do hereby declare that the following is a full, clear, and exact description of the invention, which will enable others skilled in the art to which it appertains to make and use the same, reference being had to the accompanying drawings, which form a part of this specification.

My invention relates to improvements in three-way cocks for steam and air pipes, and is designed more particularly for use in connection with the invention for drip-valves for steam-engine cylinders set forth and illustrated in an application for patent filed by me of even date herewith, Serial No. 364,355.

The object of the present invention is to provide a simple, economical, and efficient three-way cock which shall be very rapid in action and possess other advantages which will be readily apparent to those skilled in the art to which the invention pertains.

The invention consists in the novel construction and combination of parts hereinafter fully described and specifically defined in the claims.

Figure 1:
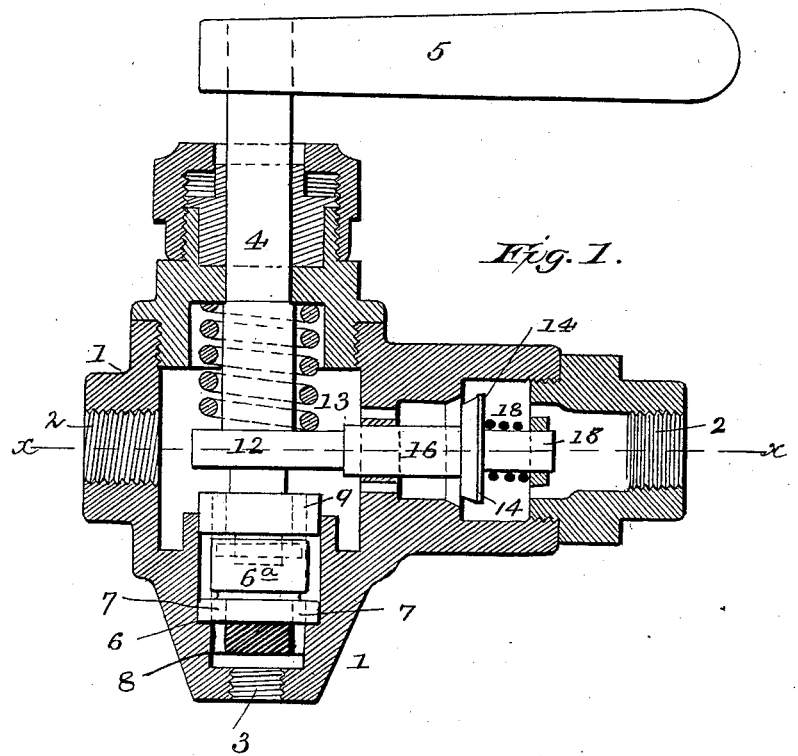
Figure 2:
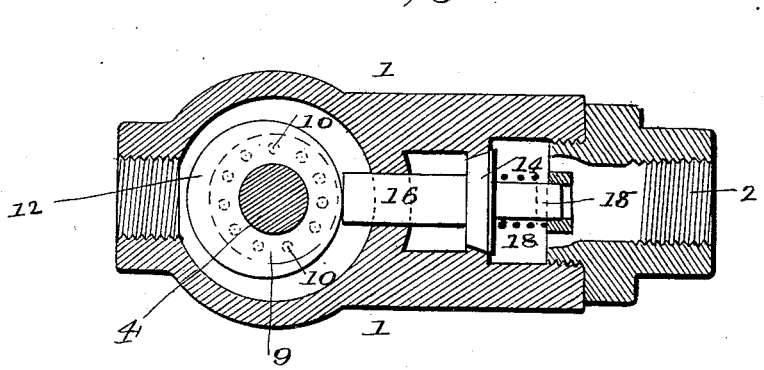

In the accompanying drawings, Figure 1 is a central longitudinal sectional view of a cock constructed according to my invention. Fig. 2 is a horizontal section on the line $x\,x$, Fig. 1.

In the said drawings, the reference-numeral 1 designates the casing of the cock, having longitudinal passage 2 and vertical passage 3. The passage 2 is designed to communicate with steam or air pipes, while passage 3 communicates with the atmosphere.

The numeral 4 designates a stem or spindle provided at one end with handle 5. At the lower end this spindle has pivoted to it a short section $6^a$, which is formed or provided with a circular valve 6, having perforations 7. This valve seats in a recess in the lower part of the valve-casing having openings 8, which correspond with openings or perforations 7. A short distance above the valve 6 the stem or spindle is provided or formed with an annular flange 9, having openings 10. This flange forms the lower bearing for the spindle. Intermediate of the ends and in line with the horizontal passage 2 the spindle is provided with an eccentric 12, and resting upon this eccentric is a coiled spring 13, which serves to keep the valve on the spindle down upon its seat. The usual packing and cap are applied to the upper end of the spindle.

The numeral 14 designates a valve located in the horizontal portion of the casing and having stems 15 and 16. These stems work in bearings 17 in the casing, and the stem 15 is provided with a coiled spring 18, which bears against the valve and one of the bearings 17, so as to keep the valve seated.

The operation is as follows: When the handle is turned, as seen in Fig. 1, the eccentric 12 will actuate the valve 14, forcing it from its seat and allowing the steam or air to pass through the same. At the same time openings 7 and 8 will be thrown out of coincidence and passage 3 closed. When it is desired to close valve 14, the handle is reversed, when the coiled spring and pressure will seat valve 14. At the same time openings 7 and 8 will register with each other and communication will be established with the open air.

Having thus described my invention, what I claim is—

1. In a cock, the combination, with the casing having a valve-seat provided with a perforation, of a spindle having a valve at one end having perforations corresponding with the perforation in said seat, an eccentric secured to said spindle, and a reciprocating valve adapted to be actuated by said eccentric, substantially as described.

2. In a cock, the combination, with the casing and a reciprocating valve having a coiled spring, of the spindle having an eccentric and a valve, substantially as described.

3. In a cock, the combination, with the casing 1, having passages 2 and 3, the valve 14, stems 15 and 16, and coiled spring 17, of the spindle 4, the pivoted section $6^a$, having flange 9, the eccentric 12, and coiled spring 13, substantially as described.

In testimony that I claim the foregoing as my own I have hereunto affixed my signature in presence of two witnesses.

HARRY HOWELL.

Witnesses:
ALFRED HINDLE,
WM. A. JENNINGS.